United States Patent
Newman et al.

[11] 3,716,437
[45] Feb. 13, 1973

[54] BASE FOR ADHESIVE TAPES

[76] Inventors: Nicholas S. Newman, 224 Chestnut Street, West Newton, Mass.; Donatas Satas, 99 Shenandoah Road, Warwick, R.I.

[22] Filed: Oct. 12, 1970

[21] Appl. No.: 33,134

Related U.S. Application Data

[62] Division of Ser. No. 806,845, March 13, 1969, abandoned.

[52] U.S. Cl. ............156/244, 117/122 PF, 156/276, 156/279, 156/298, 161/167
[51] Int. Cl. .............................................B32b 31/00
[58] Field of Search......156/148, 243, 244, 276, 279, 156/298; 117/122 P, 122 PF; 161/167, 406

[56] References Cited

UNITED STATES PATENTS

| | | | |
|---|---|---|---|
| 3,321,357 | 5/1967 | Kennedy | 156/244 |
| 3,516,886 | 6/1970 | Quackenbush et al. | 156/244 |
| 3,573,125 | 3/1971 | Elliott | 156/244 |
| 2,539,690 | 1/1951 | Boorn | 156/298 |
| 3,622,422 | 11/1971 | Newman | 156/279 |
| 3,505,144 | 4/1970 | Kilduff et al. | 161/167 |
| 3,275,487 | 9/1966 | Lemelson | 156/244 |
| 3,532,588 | 10/1970 | Newman | 156/148 |
| 3,589,958 | 6/1971 | Schrenk | 156/244 |
| 2,949,394 | 8/1960 | Rodman | 161/170 |
| 2,882,183 | 4/1959 | Bond et al. | 117/68.5 |

*Primary Examiner*—Robert F. Burnett
*Assistant Examiner*—George W. Moxon, II
*Attorney*—John F. Ryan

[57] ABSTRACT

A base film suitable for adhesive tapes of enhanced tensile strength combined with high dielectric strength is made by selecting an extruded composite film comprising a superimposed films of different softening points, and then reinforcing the lower-softening film with an unwoven and unspun array of textile-length fibers.

4 Claims, 3 Drawing Figures

BASE FOR ADHESIVE TAPES

This is a division of our application Ser. No. 806,845, filed Mar. 13, 1969, now abandoned.

This invention relates to a base for adhesive tape use, and to adhesive tapes prepared therefrom. More particularly it relates to soft and conformable adhesive tapes comprising a multicomponent film base, one component of which is fiber-reinforced and receptive to adhesive masses and the other component or components of which are non-reinforced and are more repellant to adhesive masses, the base being characterized by high tensile and high dielectric strengths.

It is known to combine thermoplastic film materials with fibrous arrays such as nonwoven fabrics to prepare bases for the manufacture of pressure-sensitive adhesive tapes. It is also known to cast a thermosetting but temporarily thermoplastic film upon a layer of thermoplastic film such as polypropylene, and to unite the combined films to a fibrous web by means of heat and pressure so as to cause the fibrous web to penetrate substantially throughout the thicknesses of both films. Such a process is disclosed in our copending U.S. patent application Ser. No. 689,010, filed Dec. 8, 1967 and now U.S. Pat. No. 3,562,088. The thermosetting but temporarily thermoplastic film is generally of the cross-linkable acrylic type.

There are certain disadvantages to the use of what may be termed transiently thermoplastic acylic films. First, as originally formed they are tacky, and must be supported on some sheet-like substrate. Second, they will cross-link and lose their thermoplastic nature on prolonged standing even at room temperature.

It is desirable, therefore, to provide a bi-component film base which is permanently thermoplastic and non-tacky at room temperatures. It is a primary object of this invention to provide such a base.

It is also an object of this invention to provide a multi-component film base for an adhesive tape wherein at least one of the films is thermoplastic and only the thermoplastic film is reinforced with a web of unspun fibers distributed substantially throughout the length, breadth, and thickness of said thermoplastic film, the other or others of said films being unreinforced by fibers.

It is a further object of the invention to provide a multi-component base for adhesive tapes of high tensile and high dielectric strengths.

Other objects of the invention will appear more fully in the following description and claims, in which:

Briefly, the process of this invention comprises the preparation of a film base made up of at least two films in adherent face-to-face contact, one of the films being of a lower softening point than the other or others. The difference in softening point is preferably at least 35°F. To this multi-component film there is applied a web or fleece of textile-length fibers, of desired chemical, electrical, and physical properties, and the assembly is then hot calendered under conditions which allow the lower-softening thermoplastic film to soften and encapsulate the textile-length fibers, while the film component or components with the higher softening points remains substantially unaffected.

Figure 1:
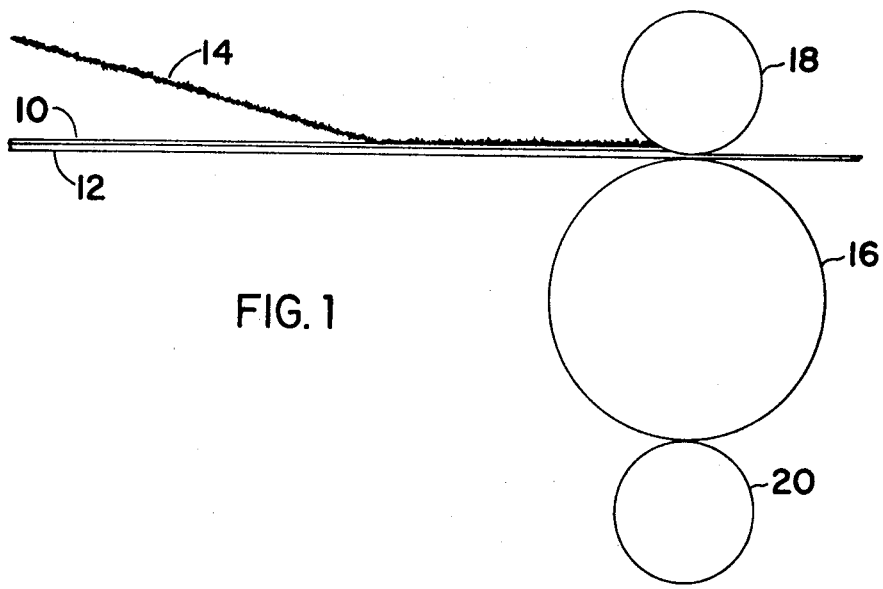
FIG. 1 is a schematic view of an apparatus suitable for producing the product of the invention.

Referring to FIG. 1, using a bi-component film as exemplar, the combined film with lower softening point 10 and film with higher softening point 12 are brought into contact with a preferably unspun and unbonded array of textile length fibers 14. In the most economical process, the films are continuously plied with a continuous fibrous fleece delivered from a card, garnett, air-lay device such as a Rando-Webber, or the like. If space requirements preclude such an operation, it is possible to prepare the fibrous fleece elsewhere and to combine fleece and films at the calendering operation. In this case, a very light bonding of the fleece may be necessary for handling purposes. However, the fibrous fleece should not be prebonded to the extent that is found in conventional nonwoven fabrics of commerce. The starting fibrous array should be so open, and the fibers so free to move with relation to each other, that the substance of the film with the lower softening point can penetrate between and surround at least a major portion of the fibers. This film with the lower softening point will for convenience be termed herein the bonding film. The fibers in the fleece are not felted, prebonded, or interengaged to more than a casual degree, so that there is minimal interference with the development of a film-to-fiber bond in which the bonding film is present in continuous phase, with at least major portion of the fibers embedded in the bonding film in discontinuous phase and distributed substantially throughout the body of the bonding film.

The term "continuous" means herein that the substance of the bonding film is not dispersed into disconnected particles or fragments, so that if the fiber substance were to be dissolved out of the film, a unitary and manipulatable bonding film would remain. In the products of this invention, the fibers are held in position essentially by the softened and resolidified bonding film substance.

By textile-length fibers is meant those fibers which, in distinction to paper-making fibers, are long enough (usually averaging one-half inch to two inches or more) to be assembled into a fibrous web by the dry-assembly machines common to the textile industry. As the fibrous element in the present invention a wide variety of natural and synthetic fibers can be used, such as cotton, rayon, acetate, polyamide, polyester, polyacrylic, and modacrylic fibers. If thermoplastic fibers are used, the fiber selection and the processing conditions should be so chosen that the hot calendering operation does not destroy the fiber identity, and that the fiber integrity is substantially preserved.

As the bi-component film two films of different softening points which have been adhesively united may be used. It is preferred, however, that the films be united by coextrusion, in which two film extruders feed thermoplastic materials of two different softening points into a specially-designed die. From the die there is delivered a single two-layered film, which presents different softening and melting points on its two faces. Such bi-component films have been made with low density polyethylene on one face, high density on the other; with ionomeric polymer on one face and nylon on the other; and with various other polymeric combinations. Three component films are also available.

Cast films prepared by coextrusion are preferred in this invention because of their lower tendency to shrink when heated.

Of special interest in, and illustrative of the practice of this invention, is the use of a bi-component film wherein one film is a copolymer of ethylene and vinyl acetate and the other film is polypropylene. In such a film, the copolymer component has a softening point of below 200°F., while the polypropylene component softens at 300°F. or higher, thus establishing a very satisfactory temperature differential. For end uses where electrical insulating properties are required, as in tapes for cable wrapping, it is preferred that a thicker layer of insulating film, such as polypropylene, be extruded with a thinner layer of the more polar copolymer film. A preferred range is where the more polar film, destined to receive the adhesive mass, constitutes between 15 and 40 percent of the total thickness of the coextruded film.

Unification of the fibrous and bonding film components by heat and pressure is conveniently provided as set forth above, by a hot-calendering operation, such as is shown schematically in FIG. 1 where the assembly is passed through a nip formed by a heated steel roll 18 against a cotton-filled roll 16, backed up for balance by another steel roll 20.

Operating conditions in the calendering step will vary with the particular films employed, a general guide being that the temperature should be high enough to soften, but not to melt, the bonding film component, while not substantially affecting the other components. This usually means that the process is carried out with the steel roll heated to the softening temperature, but preferably below the melting point, of the bonding film, or else that the processing speeds are such that the film does not become fluid.

In producing the fabric-like products of this invention it is essential that substantial pressure be applied to the combination of fibrous web and the bi-component film while the film preferably processed against a heated steel roll, is heated to the softening point of the bonding film. For this purpose it is convenient to use a nip of a three-roll calender, with an unheated husk, fiber, or cotton-filled roll 16 mounted between two steel rolls 18 and 20. The calender should be capable of operating at a pressure of at least 500 pounds per inch of nip width through pressure loading on the journals. As is known in the art, the center cotton roll, unheated except by contact with the heated steel roll or rolls, has a surface which is cooler than the steel rolls. In the practice of this invention, therefore, it is convenient to contact the fibrous web to be merged into the lower-softening film with the heated steel roll. This is especially desirable when the softening temperature differential between the two films is less than about 50°F.

It has been found that under proper pressures, the softened substance of the bonding film is made to flow through and around a majority of the fibers, which were previously unbonded. In this way the fibers are distributed discontinuously throughout the length and breadth and an appreciable part, preferably at least 80 percent, of the depth of the bonding film.

Figure 2:
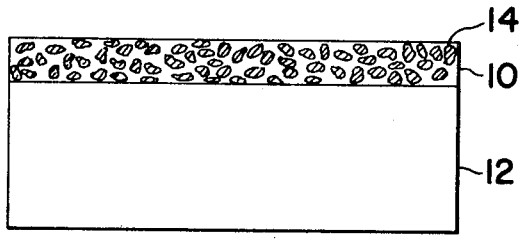
FIG. 2 is a cross-sectional view of the base product of the invention.

The structure of a typical film base for adhesive tapes is illustrated in FIG. 2, where the fibers of the unbonded web 14 are shown as dispersed substantially throughout the substance of the bonding film 10, which overlays the film of higher softening point 12, said film having been substantially unpenetrated by fibers and therefore retaining its original electrical insulating characteristics.

The preparation of tape bases, and of a pressure-sensitive adhesive tape prepared therefrom, will be illustrated by the following examples.

EXAMPLE 1

A carded web of Kodel HT (Eastman polyester) fibers 1.5 inches long, 2.5 denier, weighing 18 grams per square yard, was combined with a coextruded bi-component film, one component of which was a copolymer of ethylene and vinyl acetate, 0.3 mils thick, and the other component was 1.25 mil polypropylene. With the fibrous web horizontally disposed upon the copolymer face of the film, the assembly was hot-calendered at 16 feet per minute in the calender of FIG. 1. The temperature of the steel roll was 300°F., of the cotton roll 200°F., and the pressure was 1,250 pounds per inch of nip width.

The resulting product, resembling in cross-section that of FIG. 2, had a machine-direction tensile strength of 21 pounds per inch-wide strip, and a crosswise tensile of 10.4 pounds. The dielectric strength was 4,500 volts per mil, compared with a dielectric strength of around 1,000 volts per mil in fiber-reinforced films in which the fibers extend completely throughout the thickness of the film.

By comparison, the unbonded fibrous fleece before combining with the film had negligible strength. The bi-component film alone had a tensile strength of 7 pounds in each direction. Thus, the process of this invention has fortified the film by tripling its machine-direction tensile strength, while preserving a substantial portion of its dielectric strength. Such an enhancement of properties is very desirable in industrial and electrical adhesive tapes used for wrapping.

EXAMPLE 2

Two carded webs of nylon fibers, 1.5 inches long, 3 denier, 20 grams per square yard, were plied with the outer faces of a tri-component film made up of 45 percent polyethylene: 10 percent nylon: 45 percent polyethylene, with one web on each face. The assembly was hot calendered at 16 feet per minute in the calender of FIG. 1. The temperature of the steel roll was 305°F., of the cotton roll 205°F., and the pressure was 1250 pounds per inch of nip width.

In the resulting tape base, the polyethylene portions of the film were found to have flowed around and encapsulated the fibers of the nylon webs. The product had a tensile strength of 24 pounds per inch-side strip in the machine direction, 7 pounds in the cross direction, compared with 4 pounds and 6 pounds for the original film. The elongation of the film had been reduced from 72 percent machine direction and 250 percent cross direction to 55 percent and 119 percent respectively. The dielectric strength was 3,400 volts per mil.

EXAMPLE 3

A carded web of Kodel fibers similar to that used in Example 1 was combined with a bi-component film which consisted of a layer of 2 mil polyester film combined with a layer of polyethylene film about 0.3 mils thick. The assembly was hot calendered at 16 feet per minute in the calender of FIG. 1. The temperature of the steel roll was 375°F., of the cotton roll 265°F., and the pressure was 1,250 pounds per inch of nip width. In the resulting tape base, the polyethylene component of the film had flowed around and encapsulated the fibrous polyester web. The product had a tensile strength, per inch wide strip, of 31 pounds machine direction, 29 pounds cross direction, compared with 19 pounds and 20 pounds in the original film. The dielectric strength was 4,800 volts per mil.

To prepare an adhesive tape from the base of Example 1, a polymer suitable for use as a pressure-sensitive adhesive was prepared according to Example 12, Table III, of U. S. Pat. No. 3,299,010, issued Jan. 17, 1967. The adhesive polymer was prepared from 1 mole equivalent of ethylacrylate, 4 mole equivalents of 2-ethylhexyl acrylate, and 1 mole equivalent of a mixture of t-alkyl maleamic acids. This mixture of t-alkyl maleamic acids was prepared by reacting maleic anhydride with a mixture of alkyl amines marketed by Rohm and Haas under the trademark PRIMENE 81-R.

A 20 percent solution of this adhesive polymer in methyl ethyl ketone was spread on the copolymer film side of the fortified bi-component film described above. Anchorage of the adhesive mass to the base material was excellent, and rolls of such tape could be readily unwound without blocking or transfer of the adhesive mass to the polypropylene face of the fabric. With tensile, elongation, and electrical properties corresponding to those of the base fabric, the product had utility as a cable wrapping tape.

Figure 3:
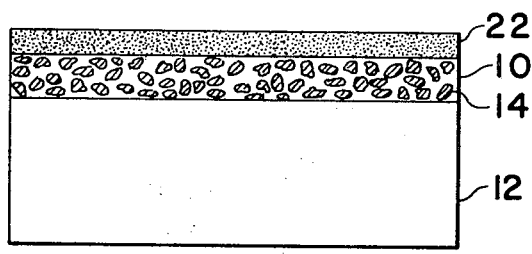
FIG. 3 is a cross-sectional view of the base product of this invention with a layer of adhesive mass adherent thereto.

The product is represented in FIG. 3, where the fibrous layer 14 is shown as distributed throughout the copolymer bonding film 10, with a layer of adhesive mass 22 superimposed thereon.

Having thus disclosed our invention, we claim:

1. A process for preparing a fiber-reinforced multi-component film base suitable for the manufacture of adhesive tapes which comprises
    extruding as a unitary sheet a plurality of polymeric films in stratified face-to-face contact,
    at least one of the exterior polymeric films having a lower softening temperature than at least one of the other of said films,
    applying to the exterior film having the lower softening point a substantially unbonded and unwoven array of intermingled textile-length fibers,
    and heating the assembly under pressure to force the textile-length fibers through at least 80% of the depth of the lower-softening film and to encapsulate the major portion of said fibers with the substance of said lower-softening film throughout the length and breadth of said lower softening film,
    while leaving the higher-softening components of the film substantially unaffected.

2. The process of claim 1 in which two films are coextruded, one being at least 35°F. lower in softening point than the other.

3. The process according to claim 2 wherein one film is polypropylene and the other film is a copolymer of ethylene and vinyl acetate.

4. The process according to claim 2 wherein one film is polyester and the other is polyethylene.

* * * * *